(12) United States Patent
Hofmann et al.

(10) Patent No.: US 8,596,873 B2
(45) Date of Patent: *Dec. 3, 2013

(54) BALL ROLLER BEARING

(75) Inventors: Heinrich Hofmann, Schweinfurt (DE); Andreas-Johann Bohr, Herzogenaurach (DE); Ernst Geiger, Hallerndorf (DE); Otmar Weber, Pommersfelden (DE)

(73) Assignee: Schaeffler Technologies AG & Co. KG, Herzogenaurch (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/496,652

(22) PCT Filed: Aug. 19, 2010

(86) PCT No.: PCT/EP2010/062107
§ 371 (c)(1),
(2), (4) Date: Mar. 16, 2012

(87) PCT Pub. No.: WO2011/032801
PCT Pub. Date: Mar. 24, 2011

(65) Prior Publication Data
US 2012/0170885 A1 Jul. 5, 2012

(30) Foreign Application Priority Data
Sep. 18, 2009 (DE) .......... 10 2009 042 076

(51) Int. Cl.
*F16C 33/38* (2006.01)

(52) U.S. Cl.
USPC ............ 384/523; 384/491; 384/533; 384/572

(58) Field of Classification Search
USPC ......... 384/533, 572, 576, 614, 623, 490–491; 29/898.065, 898.067
See application file for complete search history.

(56) References Cited

U.S. PATENT DOCUMENTS

| 2,072,515 | A | * | 3/1937 | Delaval-Crow | 384/614 |
| 2,765,518 | A | * | 10/1956 | Lovell et al. | 29/898.067 |
| 2,978,282 | A | * | 4/1961 | Fisher | 384/623 |
| 3,732,605 | A | * | 5/1973 | Scheifele | 29/898.065 |
| 4,435,024 | A | * | 3/1984 | Tagawa et al. | 384/576 |
| 2009/0180724 | A1 | | 7/2009 | Hofmann | |

FOREIGN PATENT DOCUMENTS

| DE | 3307845 A1 | * | 9/1984 | F16C 19/06 |
| DE | 102008016977 A1 | | 10/2009 | |
| JP | 2005069322 A | * | 3/2005 | F16C 33/42 |

* cited by examiner

Primary Examiner — Marcus Charles
(74) Attorney, Agent, or Firm — Lucas & Mercanti, LLP

(57) ABSTRACT

A roller bearing which has an outer and inner ring and ball rollers arranged between the rings, which roll in two groove-shaped tracks in the outer and inner rings and are held at a uniform distance to one another by a window cage that has two lateral ribs bent around two circumferential flanged edges to the inner ring and interconnected by pocket bridges. The cage pockets of the cage ribs have a hole formed from a cross-sectional contour of a ball roller arranged longitudinally to the circumferential direction and from a free contour incorporated therein and arranged perpendicular to the circumferential direction. The free contour in each cage pocket is expanded to a rectangle and the flange edges of the ribs each have reduced material thickness compared to the other material thickness of the cage by a circumferential, line-shaped burnishing.

3 Claims, 3 Drawing Sheets

BALL ROLLER BEARING

CROSS-REFERENCE TO RELATED APPLICATIONS

This application is a 371 of PCT/EP2010/062107 filed Aug. 19, 2010, which in turn claims the priority of DE 10 2009 042 076.2 filed Sep. 18, 2009. The priority of both applications is hereby claimed and both applications are incorporated by reference herein.

FIELD OF THE INVENTION

The invention relates to a single-row ball roller bearing, which can be used as a fixed bearing for the input or output shaft of a motor vehicle shift transmission, for example.

BACKGROUND OF THE INVENTION

Ball roller bearings are rolling contact bearings with special rolling elements designed as ball rollers, which, starting from a basic ball shape, each have two side faces, which are formed as flats on said basic ball shape, which are arranged parallel to one another and between which the running surfaces of the ball rollers are in each case arranged. Ball roller bearings of this kind are widely known in many different versions in the form of single-row, two-row, three-row or even four-row radial or angular contact ball roller bearings and, owing to the special shape of the rolling elements, they also require special cage designs in order, on the one hand, to limit a maximum angular position of the ball rollers relative to the longitudinal axis of the bearing and, on the other hand, to avoid wobbling of the ball rollers transversely to the direction of revolution thereof.

A single-row ball roller bearing of the type in question is already known, for example, from the German patent application with the official file reference 10 2008 016 977.3, which had not yet been published on the filing date of the present patent application, and essentially comprises an outer bearing ring, an inner bearing ring and a multiplicity of ball rollers arranged between said bearing rings, which ball rollers roll on the running surfaces thereof in two groove-shaped races machined into the inner side of the outer bearing ring and into the outer side of the inner bearing ring and are held at uniform distances from one another in the circumferential direction by a bearing cage. This bearing cage is expediently designed as a window cage having two lateral cage flanges, which are bent around two encircling flanging edges toward the inner bearing ring and are intended to guide the ball rollers axially, said flanging edges being interconnected by a plurality of pocket webs. The individual cage pockets of the bearing cage, which are separated from one another by the pocket webs, each have a cross-hole shape, which is formed from a cross-sectional contour of a ball roller, said contour being arranged longitudinally with respect to the circumferential direction, and from a free contour, which is integrated therein, is arranged transversely to the circumferential direction and is intended for the insertion of a ball roller into the bearing cage. The cross-sectional contour of the cage pockets, which is arranged longitudinally with respect to the circumferential direction, corresponds to the shape of a section plane arranged above the transverse axis of a ball roller, while the free contour of the cage pockets, which is arranged transversely to the circumferential direction, has the shape of a section plane arranged directly on the transverse axis of a ball roller. To produce a bearing cage of this kind, use is generally made of a sheet-metal strip, which is finished by profiling the cage flanges, punching the cage pockets, cutting to length to give the dimension of the circumference, rolling into a ring and welding the ends of the ring.

It has been found in practice, however, that the production of the bearing cage in the form described is subject to special technical problems, and furthermore the bearing cage does not fully meet the specified requirements in terms of quality. This is connected especially with the cage flanges formed as a profile on the sheet-metal strip, which lead to constrictions of the material as the cage is rolled into a ring, the effect of said constrictions being that the cage flanges do not have a smooth and flat surface but a wavy surface. It has likewise proven extremely difficult to flange these cage flanges further in the direction of the side faces of the ball rollers after the filling of the ball roller bearing with the ball rollers in order to produce an axial guide for said rollers, since the flanging edges have a high stiffness and, as a result, there are further deformations in the bearing cage during the flanging of the cage flanges on the filled bearing. Moreover, the pocket webs of the bearing cage, which are of relatively wide and thus very stiff configuration at the transitions thereof to the cage flanges, owing to the round cross hole shape of the cage pockets, also contribute to said cage being more polygonal than round in the final form thereof.

SUMMARY OF THE INVENTION

Starting from the disadvantages explained of the known prior art, it is therefore the underlying object of the invention to design a ball roller bearing, the bearing cage of which has a design configuration such that the pocket webs thereof ensure a round final shape of the cage and that the cage flanges thereof have a smooth surface after it is rolled into a ring and do not cause any further deformations in the bearing cage after the final additional flanging in the direction of the side faces of the ball rollers.

According to the invention, this object is achieved, in the case of a ball roller bearing where the free contour in each cage pocket of the bearing cage is designed so as to be enlarged to the geometric shape of a rectangle and in that the flanging edges of the cage flanges are each designed to have a material thickness which is reduced compared to the remaining material thickness of the bearing cage by an encircling linear rolled profile.

The invention is based on the insight that enlarging the round free contour of each cage pocket to the shape of a rectangle makes it possible, without impairing the functioning of the bearing cage, to design the pocket webs between the cage pockets in such a way that they are narrower at the transitions thereof to the cage flanges, and thus to reduce the stiffness thereof in such a way that the bearing cage has the desired roundness in the final form thereof after being rolled into a ring. Moreover, roller forming the flanging edges also reduces the stiffness thereof in such a way that constrictions of the material at the cage flanges as the cage is rolled into a ring are reduced to a minimum, and the cage flanges have a smooth and flat surface. At the same time, roller forming the flanging edges also considerably facilitates deformability during the final additional flanging in the direction of the side faces of the ball rollers, with the result that no further deformations are caused in the bearing cage during this process either, and the dimensional accuracy thereof is improved.

Thus, according to one embodiment of the invention, the short sides of the rectangle of the free contour are arranged so as to extend as far as or almost as far as the flanging edges of the cage flanges and so as to run parallel thereto. This design is intended to ensure that the width of the pocket webs at the transitions thereof to the cage flanges is minimized right up to the cage flanges in order to achieve a maximum possible reduction in stiffness.

In another embodiment of the invention, the free contour in each cage pocket is additionally designed with notches, which are machined into the long sides of the rectangle and extend the short sides thereof. By such a measure, it is thus possible to further reduce the width of the pocket webs at the transitions thereof to the cage flanges, thus ensuring a maximum of flexibility in the pocket webs as the bearing cage is rolled into a ring and ensuring that the bearing cage has the desired roundness. It is particularly advantageous here to make the notches semicircular, triangular or quadrilateral.

BRIEF DESCRIPTION OF THE DRAWINGS

A preferred embodiment of the ball roller bearing designed in accordance with the invention is explained in greater detail below with reference to the attached drawings, in which.

DETAILED DESCRIPTION OF THE INVENTION

Figure 2:
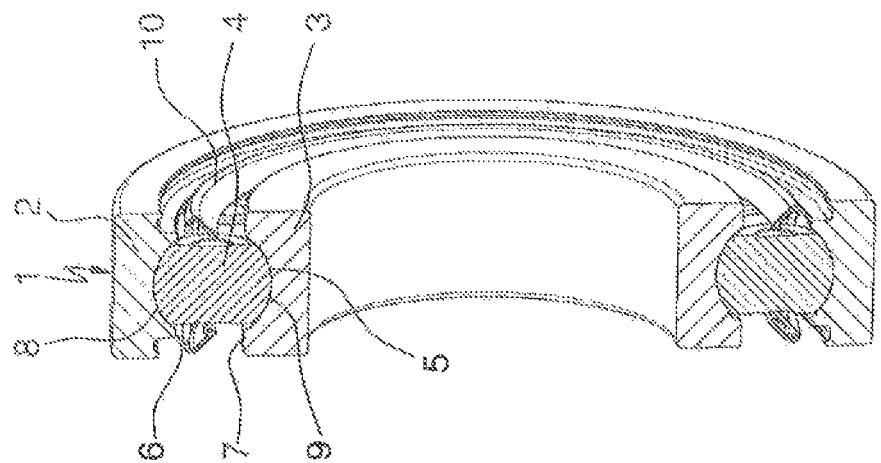
FIG. 2 shows a perspective view of a cross section through the ball roller bearing designed in accordance with the invention and shown in FIG. 1.
Figure 1:
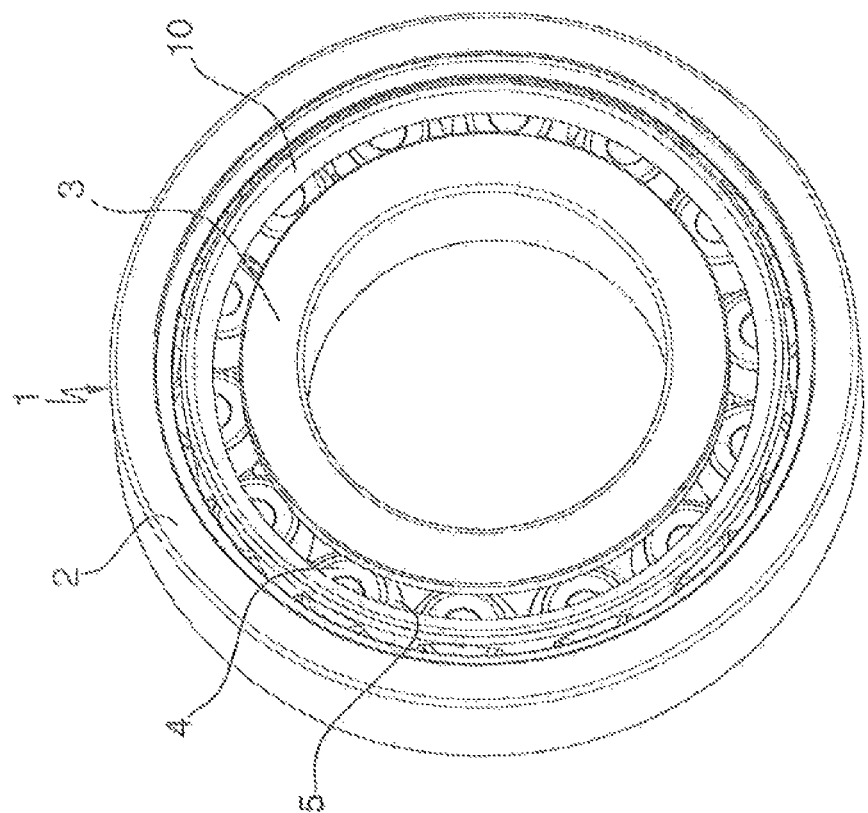
FIG. 1 shows an overall perspective view of a ball roller bearing designed in accordance with the invention.
Figure 3:
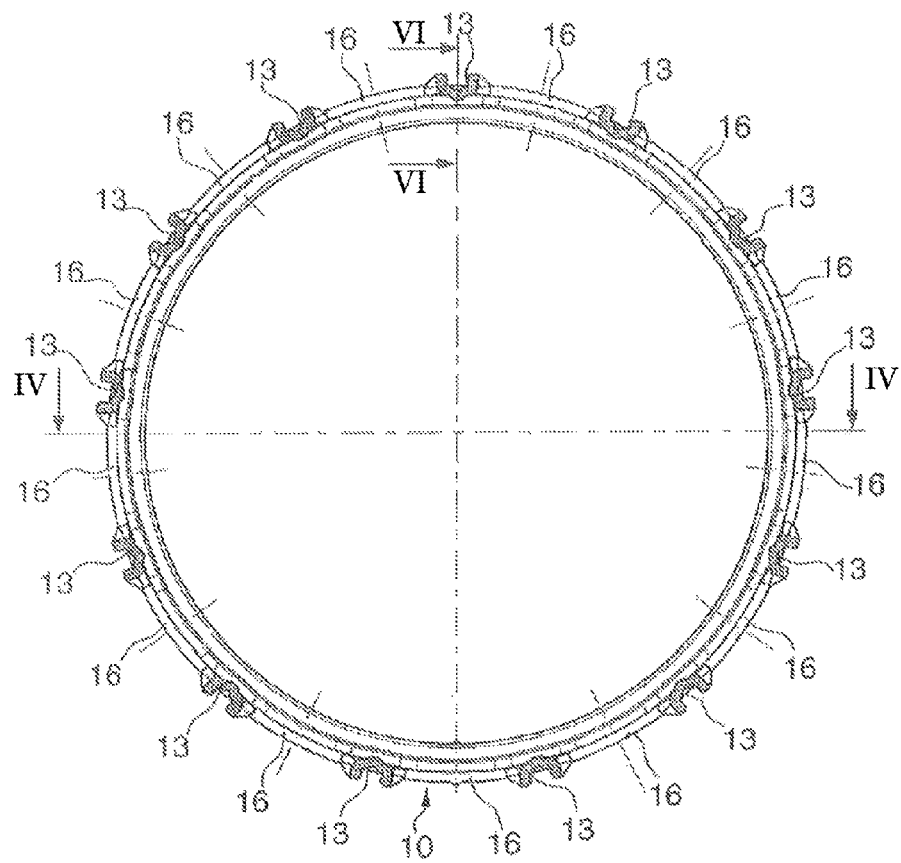
FIG. 3 shows the section II-II through the bearing cage of the ball roller bearing designed in accordance with the invention and shown in FIG. 4.
Figure 4:
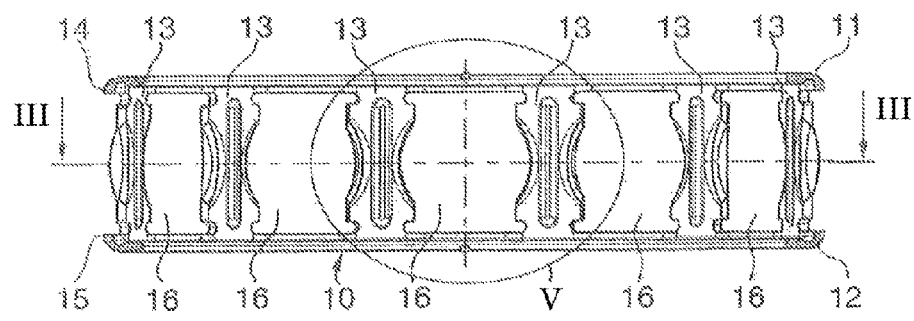
FIG. 4 shows the section IV-IV through the bearing cage of the ball roller bearing designed in accordance with the invention and shown in FIG. 3.
Figure 5:
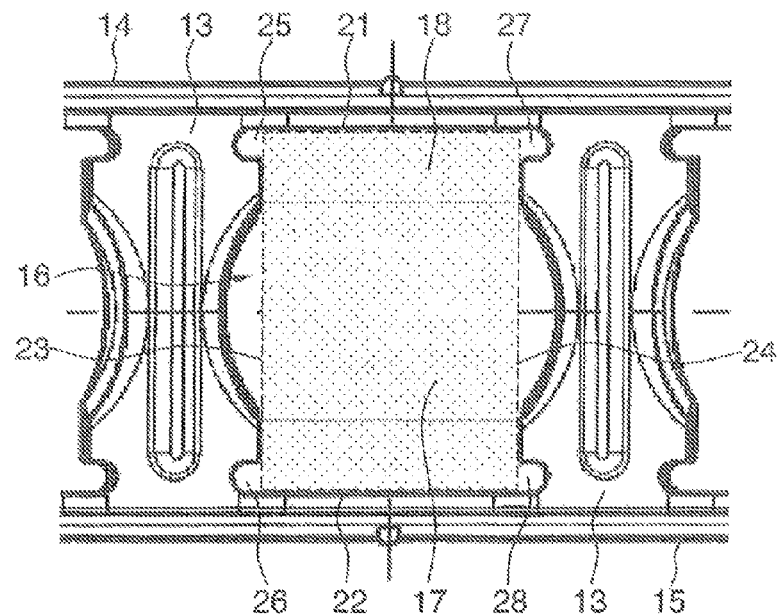
FIG. 5 shows an enlarged view of the detail V of the bearing cage of the ball roller bearing designed in accordance with the invention and shown in FIG. 4.

A ball roller bearing 1 is clearly apparent from FIGS. 1 and 2, essentially comprising an outer bearing ring 2, an inner bearing ring 3 and a multiplicity of ball rollers 4 arranged between said bearing rings 2, 3. The ball rollers 4 roll on running surfaces 5 in two groove-shaped races 8, 9 machined into the inner side 6 of the outer bearing ring 2 and into the outer side 7 of the inner bearing ring 3, and the ball rollers 4 are held at uniform distances from one another in the circumferential direction by a bearing cage 10. As FIGS. 3 and 4 show, the bearing cage 10 is designed as a window cage, which has two lateral cage flanges 14, 15, which are bent around two encircling flanging edges 11, 12 toward the inner bearing ring 3, are interconnected by a plurality of pocket webs 13 and are intended to guide the ball rollers 4 axially. The individual cage pockets 16 of the bearing cage, which are separated from one another by the pocket webs 13, each clearly have a cross-hole shape, which, as illustrated in FIG. 5, is formed from a cross-sectional contour 17 of a ball roller 4. The contour 17 is arranged longitudinally with respect to the circumferential direction and is indicated by dotted reference lines, and from a free contour 18, which is integrated therein, is arranged transversely to the circumferential direction, is indicated by dashed reference lines and is intended for the insertion of a ball roller 4 into the bearing cage 10.

FIG. 5 furthermore makes clear that, according to the invention, the free contour 18 in each cage pocket 16 of the bearing cage 10 is designed so as to be enlarged to the geometric shape of a rectangle, represented as a dotted surface, in order to make the pocket webs 13 between the cage pockets 16 narrower at the transitions thereof to the cage flanges 14, 15 and thus reduce the stiffness thereof. As is clearly apparent, the short sides 21, 22 of the rectangle of the free contour 18 extend almost as far as the flanging edges 11, 12 of the cage flanges 14, 15 and are arranged so as to run parallel thereto. In addition, the free contour 18 in each cage pocket 16 is designed with notches 25, 26, 27, 28, which are machined into the long sides 23, 24 of the rectangle and extend the short sides 21, 22 thereof, in order in this way to reduce even further the width of the pocket webs 13 at the transitions thereof to the cage flanges 14, 15 and to ensure a maximum of flexibility in the pocket webs 13 as the bearing cage 10 is rolled into a ring.

Figure 6:
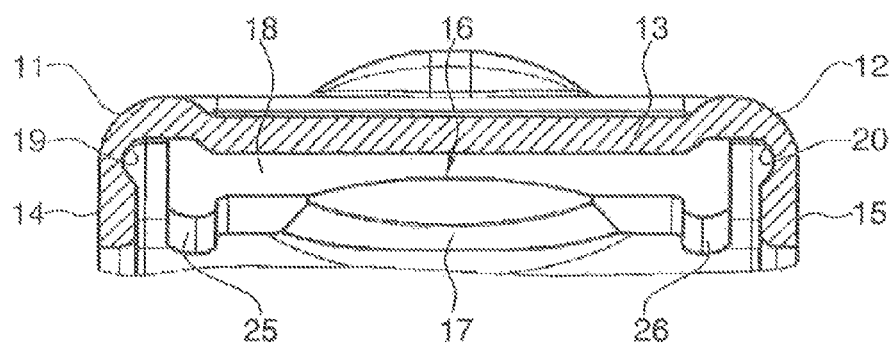
FIG. 6 shows the section VI-VI through the bearing cage of the ball roller bearing designed in accordance with the invention and shown in FIG. 3.

Finally, it is apparent from FIG. 6 that the flanging edges 11, 12 of the cage flanges 14, 15 are furthermore each designed to have a material thickness which is reduced compared to the remaining material thickness of the bearing cage 10 by an encircling linear rolled profile 19, 20. As a result, the stiffness of the flanging edges 11, 12 is also reduced in such a way that constrictions of the material at the cage flanges 14, 15 as the cage is produced are reduced to a minimum, and no further deformations are caused in the bearing cage 10 during the final flanging in the direction of the side faces of the ball rollers 4. Moreover, the rolled profiles 19, 20 on the flanging edges 11, 12 enable the cage flanges 14, 15 to be made radially longer than in the form illustrated in FIG. 6 and, if appropriate, to be reinforced with an encircling bead. This makes a bearing cage 10 of this kind suitable even for applications involving very high axial loads or alternating axial loads, in which case it is advantageous to partially harden or coat the extended cage flanges 14, 15 in addition in order to minimize wear.

LIST OF REFERENCE SIGNS

1 Ball Roller Bearing
2 Outer Bearing Ring
3 Inner Bearing Ring
4 Ball Rollers
5 Running Surfaces
6 Inner Side of 2
7 Outer Side of 3
8 Race in 6
9 Race in 7
10 Bearing Cage
11 Flanging Edge
12 Flanging Edge
13 Pocket Webs
14 Cage Flange
15 Cage Flange
16 Cage Pockets
17 Cross-Sectional Contour of 4 in 16
18 Free Contour in 16
19 Rolled Profile in 11
20 Rolled Profile in 12
21 Short Side of 18
22 Short Side of 18
23 Long Side of 18
24 Long Side of 18
25 Notch in 23
26 Notch in 23
27 Notch in 24
28 Notch in 24

The invention claimed is:

1. A ball roller bearing, comprising:

an outer bearing ring having a first groove-shaped race machined into an inner side of the outer bearing ring;

an inner bearing ring having a second bearing race machined into an outer side of the inner bearing ring; and a plurality of ball rollers arranged between the bearing rings, the ball rollers have running surfaces and roll between the first groove-shaped race of the outer bearing ring and the second groove-shaped race of the inner bearing ring; and a bearing cage holding the ball rollers at uniform distances from one another in a circumferential direction, wherein the bearing cage is a window cage having two lateral cage flanges bent around two encircling flanging edges toward the inner bearing ring, a plurality of pocket webs being arranged to interconnect the cage flanges and form cage pockets that guide the ball rollers axially, wherein each of the cage pockets have a cross-hole shape formed from a cross-sectional contour of one of the ball rollers, which contour is arranged longitudinally with respect to the circumferential direction, and from a free contour, which is integrated in the cage pockets, arranged transversely to the circumferential direction and permits insertion of the ball rollers into the bearing cage, wherein the free contour in each of the cage pockets of the bearing cage has a rectangular shape, and wherein the flanging edges of the cage flanges each have a material thickness, which is reduced relative to a remaining material thickness of the bearing cage by an encircling linear rolled profile.

2. The ball roller bearing as claimed in claim 1, wherein the free contour, which has a rectangular shape, has short sides arranged so as to extend at least substantially as far as the flanging edges of the cage flanges and so as to run parallel to the flanging edges.

3. The ball roller bearing as claimed in claim 1, wherein the free contour in each of the cage pockets has notches, which are machined into long sides of the rectangular shape and extend to short sides of the rectangular shape.

* * * * *